United States Patent
Shimizu et al.

(10) Patent No.: US 10,800,410 B2
(45) Date of Patent: Oct. 13, 2020

(54) DRIVING SUPPORT DEVICE

(71) Applicant: TOYOTA JIDOSHA KABUSHIKI KAISHA, Toyota-shi, Aichi-ken (JP)

(72) Inventors: Tsuyoshi Shimizu, Toyota (JP); Masaki Takano, Susono (JP); Masato Takagi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 200 days.

(21) Appl. No.: 16/140,051

(22) Filed: Sep. 24, 2018

(65) Prior Publication Data

US 2019/0092321 A1    Mar. 28, 2019

(30) Foreign Application Priority Data

Sep. 26, 2017  (JP) .................. 2017-184334

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |

(Continued)

(52) U.S. Cl.
CPC ............ *B60W 30/09* (2013.01); *B60W 30/12* (2013.01); *B60W 40/08* (2013.01); *B62D 1/286* (2013.01); *B62D 15/025* (2013.01); *B60W 10/04* (2013.01); *B60W 10/18* (2013.01); *B60W 10/20* (2013.01);
(Continued)

(58) Field of Classification Search
CPC ...... B60W 10/04; B60W 10/18; B60W 10/20; B60W 2040/0818; B60W 2420/403; B60W 2420/52; B60W 30/09; B60W 30/12; B60W 40/08; B62D 15/025; B62D 1/286

See application file for complete search history.

(56) References Cited

U.S. PATENT DOCUMENTS

2005/0270145 A1    12/2005  Kataoka et al.
2006/0025918 A1    2/2006   Saeki
(Continued)

FOREIGN PATENT DOCUMENTS

EP    3075618 A2      10/2016
JP    2005343303 A    12/2005
(Continued)

*Primary Examiner* — Harry Y Oh
(74) *Attorney, Agent, or Firm* — Hunton Andrews Kurth LLP (57) ABSTRACT

The driving support ECU performs a steering control for changing a steering angle in such a manner that an own vehicle travels along a target path. When a state in which holding state information does not satisfy a first condition continues for a first time threshold or more, the ECU starts a first alert and continues the steering control. The holding state information includes information indicative of a steering torque and represents a holding state of a steering handle by a driver. When a state in which the holding state information does not satisfy a second condition for a second time threshold or more after the first alert is started, the ECU starts a deceleration control. The second condition is a condition satisfied when the holding state information indicates that the driver holds the steering handle more firmly than when the holding state information satisfies the first condition.

4 Claims, 7 Drawing Sheets

(51) Int. Cl.
*B63H 25/04* (2006.01)
*G05D 1/00* (2006.01)
*G06F 7/00* (2006.01)
*G06F 17/00* (2019.01)
*B60W 30/09* (2012.01)
*B62D 15/02* (2006.01)
*B62D 1/28* (2006.01)
*B60W 30/12* (2020.01)
*B60W 40/08* (2012.01)
*B60W 10/04* (2006.01)
*B60W 10/18* (2012.01)
*B60W 10/20* (2006.01)

(52) U.S. Cl.
CPC .............. *B60W 2040/0818* (2013.01); *B60W 2420/403* (2013.01); *B60W 2420/52* (2013.01)

(56) References Cited

U.S. PATENT DOCUMENTS

| | | | | |
|---|---|---|---|---|
| 2013/0317699 | A1* | 11/2013 | Urhahne | B62D 15/025 701/41 |
| 2016/0033964 | A1* | 2/2016 | Sato | B60K 28/06 701/24 |
| 2017/0088175 | A1* | 3/2017 | Okuda | B62D 6/00 |
| 2017/0232973 | A1* | 8/2017 | Otake | B60W 50/14 701/43 |

FOREIGN PATENT DOCUMENTS

| | | |
|---|---|---|
| JP | 2006044326 A | 2/2006 |
| JP | 2006315491 A | 11/2006 |
| JP | 2007253820 A | 10/2007 |
| JP | 2008195402 A | 8/2008 |
| JP | 4172434 B2 | 10/2008 |
| JP | 2009190464 A | 8/2009 |
| JP | 4349210 B2 | 10/2009 |
| JP | 2010006279 A | 1/2010 |
| JP | 2010023699 A | 2/2010 |
| JP | 4929777 B2 | 5/2012 |
| JP | 2014148293 A | 8/2014 |
| JP | 2014190856 A | 10/2014 |
| JP | 2015120374 A | 7/2015 |
| JP | 2017065273 A | 4/2017 |
| JP | 2017144808 A | 8/2017 |

* cited by examiner

FIG.8

DRIVING SUPPORT DEVICE

CROSS-REFERENCE TO RELATED APPLICATION

The present application claims priority to Japanese Patent Application No. 2017-184334 filed on Sep. 26, 2017, which is incorporated herein by reference in its entirety.

BACKGROUND

Technical Field

The present disclosure relates to a driving support device configured to perform a steering control for changing a steering angle of an own vehicle in order to make the own vehicle travel along a target path (or target line), and to perform a deceleration control when a driver has fallen into an incompetent (or abnormal) state.

Related Art

Hereinto, as proposed in Japanese Patent Application Laid-open No. 2017-144808, there has been known a driving support device configured to perform a lane keeping control (a steering control) and to perform a deceleration control for decelerating an own vehicle (reduce a vehicle velocity of the own vehicle) when a driver has fallen into an incompetent state in which the driver loses his/her ability to drive the own vehicle. The lane keeping control is a control for providing steering torque to a steering mechanism in order to keep an own vehicle location/position near a target traveling line in a lane (a traveling lane) in which the own vehicle is traveling, to support a steering operation of the driver.

The driving support device determines that a "no-holding driving state" in which the driver does not hold a steering handle/wheel has occurred, when a steering torque Tra has been "0" for a first time period or more while the lane keep change control is being performed. The driving support device performs/generates a "no-hold alert" when it is determined that the no-holding driving state has occurred.

In addition, the driving support device terminates the lane keeping control which has been being performed (hereinafter, referred to as "a normal state lane keeping control"), and starts an incompetent state determination lane change control which is similar to the normal state lane keeping control, when the steering torque Tra has been "0" for a second time period or more since the no-hold alert was started. The driving support device determines that the driver has fallen into an incompetent state, when a "no-operation state" continues for a third time threshold T3$th$ or more after the incompetent state determining lane change control was started. The driving support device performs a deceleration control when it is determined that the driver has fallen into the incompetent state.

The no-operation state means a state in which any one of parameters including "an accelerator pedal operation amount, a brake pedal operation amount, and the steering torque" does not change, or, a state in which the steering torque is "0".

SUMMARY

The above described driving support device performs the incompetent state determination lane keeping control for an incompetent state determination time period for which the driving support device determines whether or not the driver has fallen into the incompetent state. In other words, the driving support device determines whether or not the driver has fallen into the incompetent state in a period in which the incompetent state determination lane keeping control may generate the steering torque.

Even if the driver has actually fallen into the incompetent state, the above described driving support device may make an incorrect determination that the driver has not fallen into the incompetent state, when the incompetent state determination lane keeping control performed in the incompetent state determination time period changes the steering torque, or increases a magnitude of the steering torque so that the magnitude becomes greater than "0". The driving support device does not perform the deceleration control when the driving support device makes the above incorrect determination, even if the driver has actually fallen into the incompetent state.

The present disclosure has been made to solve the problem described above. The present disclosure has an object to provide a driving support device which reduces a possibility that the driving support device makes the "incorrect determination that the driver has not fallen into the incompetent state in spite the fact that the driver has actually fallen into the incompetent state" due to the increase in the steering torque caused by the lane keeping control, so as to be able to perform the deceleration control appropriately when the driver has fallen into the incompetent state.

The driving support device (hereinafter, referred to as the "present device") according to the present disclosure comprises:

a steering control unit (10, 50, 51, 52, 70, 71, 72) for performing a steering control for changing a steering angle of an own vehicle in such a manner that the own vehicle travels along a target path (a target traveling line Ld);

a deceleration unit (10, 20, 21, 22, 30, 31, 32, 70, 71, 72) for performing a deceleration control for decelerating the own vehicle while the steering control unit is performing the steering control (Step 760); and a steering torque detection unit (10, 11, Step 505) for detecting a steering torque (Tra).

Furthermore, the steering control unit configured to start a first alert to a driver (Step 670) and to continue performing the steering control (Step 625), when a state in which holding state information does not satisfy a predetermined first condition (Step 515, "Yes" at Step 520, Step 810, "Yes" at Step 815) continues for a first time threshold (T1$th$) or more (time point t2, "Yes" at Step 640, Step 650) while the steering control unit is performing the steering control, the holding state information including information indicative of the steering torque detected by the steering torque detection unit and representing a holding state of a steering handle of the own vehicle by the driver; and the deceleration unit configured to start the deceleration control (Step 760) when a state in which the holding state information does not satisfy a predetermined second condition ("Yes" at Step 520, Step 550, "Yes" at Step 815, Step 820 continues for a second time threshold or more (a time point t4, "Yes" at Step 730, Step 745) after a predetermined time point (a time point t3, "Yes" at Step 665, and Step 680) which is after a time point at which the steering control unit starts the first alert (the time point t2), the predetermined second condition being a condition satisfied when the holding state information indicates that the driver holds the steering handle more firmly than when the holding state information satisfies the first condition.

According to the present device, it is determined that the driver has fallen into the incompetent state, and the deceleration control is started, when the state in which the holding state information does not satisfy the predetermined second condition continues for the second time threshold or more after a start of the determination regarding the incompetent state of the driver. The predetermined second condition is a condition satisfied when the holding state information represents/indicates that the driver holds the steering handle more firmly/certainly than when the predetermined first condition is satisfied. Thus, the present device can reduce a possibility that the present device incorrectly/erroneously determines that the driver has not fallen into the incompetent state due to the increase in the steering torque caused by the steering control which is performed after the start of the determination regarding the incompetent state of the driver, in spite of the situation in which the driver has actually fallen into the incompetent state. Accordingly, the present device can perform the deceleration control appropriately when the driver has fallen into the incompetent state.

According to one embodiment of the present disclosure, the steering control unit is configured to determine that the holding state information does not satisfy the first condition, when the steering torque is equal to or smaller than a predetermined first torque threshold (Tr1*th*) (Step 515, "Yes" at Step 520), and the deceleration unit is configured to determine that the holding state information does not satisfy the second condition, when the steering torque is equal to or smaller than a predetermined second torque threshold (Tr2*th*) which is greater than the first torque threshold ("Yes" at Step 520, Step 550).

When the steering torque is equal to or smaller than the second torque threshold greater than the first torque threshold after the start of the determination regarding the incompetent state of the driver, it is determined that the holding state information does not satisfy the second condition. Even if the steering torque generated by the steering control performed after the start of the determination becomes greater than the first torque threshold, the holding state information does not satisfy the second condition when the steering torque is equal to or smaller than the second torque threshold. The present device can reduce the possibility that the present device incorrectly/erroneously determines that the driver has not fallen into the incompetent state due to the increase in the steering torque through (owing to) the steering control performed after the start of the determination. Thereby, the present device can perform the deceleration control appropriately when the driver has fallen into the incompetent state.

According to one embodiment of the present disclosure,

The present device further comprises a touch finger number detection unit (12) for detecting a touch finger number (N) indicative of the number of the driver's fingers which are touching the steering handle.

The holding state information includes the touch finger number detected by the touch finger number detection unit.

The steering control unit is configured to determine that the holding state information does not satisfy the first condition, when at least one of a condition that the steering torque is equal to or smaller than a predetermined torque threshold (Trth) or a condition that the touch finger number is equal to or smaller than a predetermined first number threshold (N1*th*) is satisfied (Step 810, "Yes" at Step 815), and the deceleration unit is configured to determine that the holding state information does not satisfy the second condition, when at least one of a condition that the steering torque is equal to or smaller than the torque threshold or a condition that the touch finger number is equal to or smaller than a predetermined second number threshold (N2*th*) greater than the first number threshold is satisfied ("Yes" at Step 815, Step 820).

In this embodiment, even if the steering torque which is generated by the steering control performed after the start of the determination becomes greater than the torque threshold, the holding state information does not satisfy the second condition as long as the touch finger number does not become greater than the second number threshold greater than the first number threshold. Meanwhile, when the driver has not fallen into the incompetent state, the driver is likely to notice the first alert so as to hold the steering handle, after the start of the determination. In this case, the touch finger number is likely to change from a value equal to or smaller than the first number threshold to a value greater than the second number threshold. In contrast, when the driver has fallen into the incompetent state, the touch finger number is unlikely to change from the value equal to or smaller than the first number threshold to the value greater than the second number threshold after the start of the determination. For those reasons, the present device can reduce the possibility that the present device incorrectly determines that the driver has not fallen into the incompetent state due to the increase in the steering torque described above, in spite of the situation in which the driver has actually fallen into the incompetent state.

According to one embodiment of the present disclosure, the deceleration unit is configured to have set the second time threshold to a value greater than the first time threshold.

The present device of the above embodiment determines that the driver has fallen into the incompetent state and performs the deceleration control, when the state in which the second condition is not satisfied continues for the second time threshold greater than the first time threshold. Therefore, the present device of the above embodiment can determine that the driver has fallen into the incompetent state more accurately.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAILED DESCRIPTION

Figure 1:
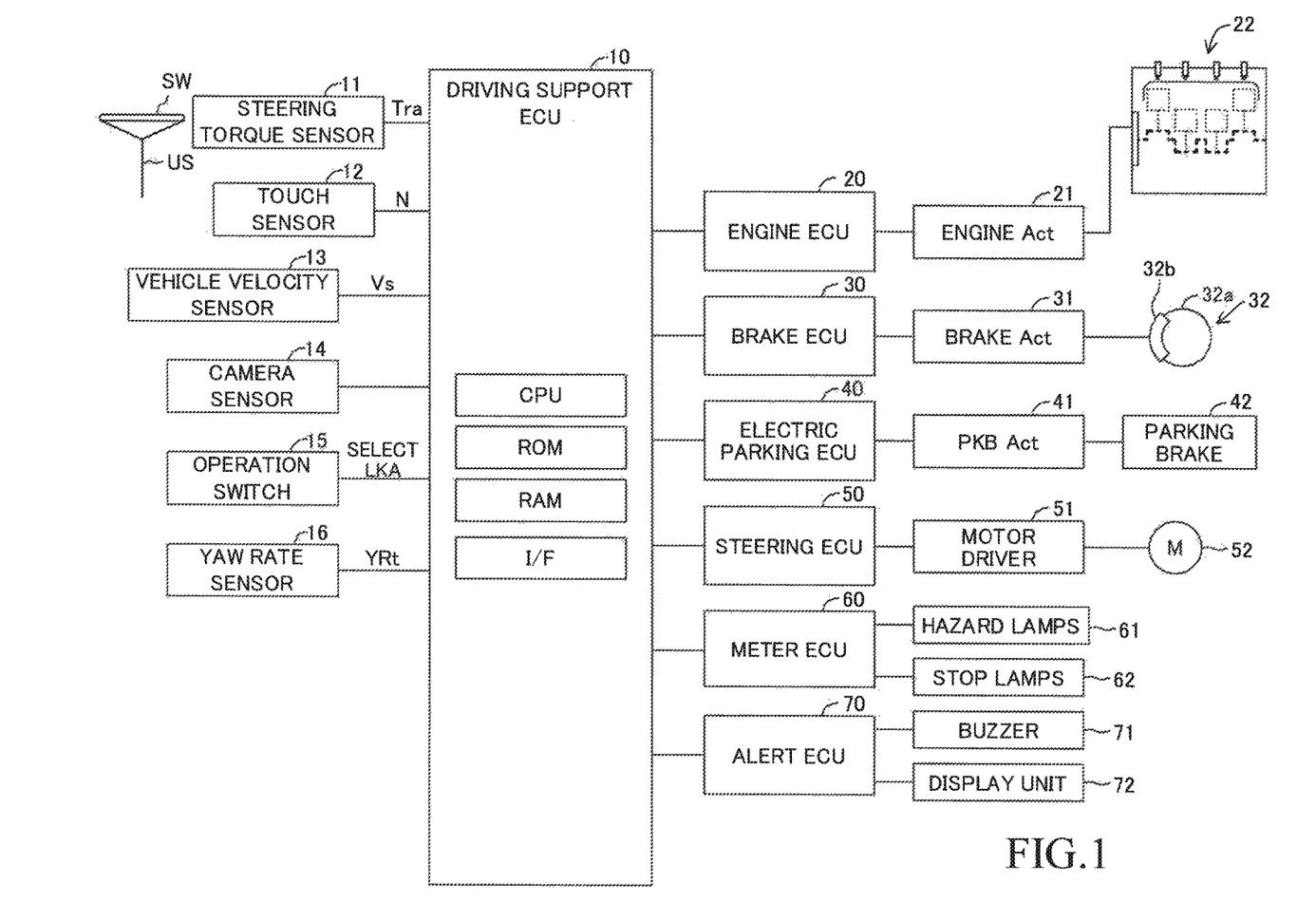
FIG. 1 is a schematic system configuration diagram of a driving support device (the present support device) according to an embodiment of the present disclosure.

A driving support device (hereinafter, may be referred to as the "present support device") according to an embodiment of the present disclosure is installed in a vehicle. The vehicle in which the driving support device is installed is referred to as an "own vehicle SV", when this vehicle needs to be distinguished from other vehicles. The present support device comprises a driving support ECU 10, an engine ECU 20, a brake ECU 30, an electric parking brake ECU 40, a steering ECU 50, a meter ECU 60, and an alert ECU 70. The driving support ECU 10 is simply referred to as a "DSECU 10".

Each of these ECUs is an "Electronic Control Unit" which includes a microcomputer as a main part, and is connected to each other via a CAN (Controller Area Network) to be able to transmit information to each other and to receive information from each other. In this specification, the microcomputer includes a CPU, a ROM, a RAM, a non-volatile memory, an interface (I/F), and the like. The CPU achieves various functions through executing instructions (program, routine) stored in the ROM. Some or all of these ECUs may be integrated into a single ECU.

The DSECU 10 is connected to the following sensors (including a switch). The DSECU 10 receives a detection signal or an output signal from each of these sensors. In some embodiments, each of these sensors is connected to the ECU other than the DSECU 10. In this case, the DSECU 10 receives, via the CAN, the detection signal or the output signal from the ECU to which each of these sensors is connected.

A steering torque sensor 11 detects a steering torque applied to a steering shaft US through an operation which is performed on a steering handle SW. The steering torque sensor 11 outputs a signal indicative of the steering torque Tra.

A touch sensor 12 detects the number N of fingers (hereinafter, referred to as a "touch finger number N") indicative of the number of fingers of a driver which are touching the steering handle SW. The touch sensor 12 outputs a signal indicative of the detected touch finger number N. The following type sensor can be used as the touch sensor 12. For example, the touch sensor 12 may be a capacitance type censer whose capacitance changes depending on the numbers of the driver's fingers which are touching the steering handle SW. This type of the sensor is described in Japanese Patent Application Laid-open No. 2010-23699, Japanese Patent Application Laid-open No. 2014-190856, and the like. A vehicle velocity sensor 13 detects a traveling velocity (a vehicle velocity/speed) Vs of the own vehicle SV, and outputs a signal indicative of the detected vehicle velocity Vs.

A camera sensor 14 includes a stereo camera and a processing unit. The camera sensor 14 photographs a front left side area and a front right side area of the own vehicle SV to acquire image data including left image data acquired by photographing the front left side area and right image data acquired by photographing the front right side area at the same timing, every time a predetermined time period elapses. The camera sensor 14 transmits the acquired image data to the DSECU 10.

The DSECU 10 performs an image processing of the image data which the DSECU 10 receives from the camera sensor 14 to acquire processed image data. The DSECU 10 acquires (recognizes) lane-dividing markers (lane markers, hereinafter referred to as "white lines") on the road on which the own vehicle SV is traveling based on the processed image data. The DSECU 10 recognizes a white line which is located in a left side area of the own vehicle SV in a traveling direction of the own vehicle SV as a left white line. The DSECU 10 recognizes a white line which is located in a right side area of the own vehicle SV in the traveling direction of the own vehicle SV as a right white line.

An operation switch 15 is a switch operated by the driver. The driver performs the operation on the operation switch so as to be able to select whether or not a lane keeping control is allowed/requested to be performed. The lane keeping control may be referred to as a LKA (a Lane Keeping Assist control).

A yaw rate sensor 16 detects a yaw rate generated in the own vehicle SV, and output an actual yaw rate signal YRt indicative of the detected yaw rate.

The engine ECU 20 is connected to an engine actuator 21. The engine actuator 21 is an actuator for changing an operating state of an internal combustion engine 22. In the present embodiment, the internal combustion engine 22 is a gasoline-fuel injection, spark-ignition-type, and multi-cylinder engine. Furthermore, the internal combustion engine 22 has a throttle valve for adjusting an amount of intake air. The engine actuator 21 includes at least a throttle valve actuator for changing opening of the throttle valve. The engine ECU 20 can change torque generated by the internal combustion engine 22 through driving the engine actuator 21. The torque generated by the internal combustion engine 22 is transmitted to unillustrated drive wheels through an unillustrated transmission. Accordingly, the engine ECU 20 can control driving force of the own vehicle SV through controlling the engine actuator 21, to thereby change an accelerating state (acceleration) of the own vehicle SV.

The brake ECU 30 is connected to a brake actuator 31. The brake actuator 31 is provided in a hydraulic circuit between an "unillustrated master cylinder which pressurizes hydraulic oil by using the depressing force applied to an unillustrated brake pedal" and "friction brake mechanisms 32 provided in a front left wheel, a front right wheel, a rear left wheel, and a rear right wheel". Each of the friction brake mechanisms 32 includes a brake disc 32a fixed to a wheel and a brake caliper 32b fixed to a vehicle-body. The brake actuator 31 adjusts the pressure of oil supplied to a wheel cylinder incorporated into the brake caliper 32b in response to an instruction from the brake ECU 30 and operates the wheel cylinder through using the oil pressure so as to press a brake pad against the brake disc 32a to thereby generate a frictional braking force. Thus, the brake ECU 30 controls the brake actuator 31 to adjust braking force of the own vehicle SV.

The electric parking brake ECU (hereinafter may be referred to as an "EPB ECU") 40 is connected to a parking brake actuator (hereinafter may be referred to as a "PKB actuator") 41. The PKB actuator 41 is an actuator for pressing the brake pad to the brake disc 32a. If the own vehicle SV has a drum brake, the PKB actuator 41 is an actuator for pressing a brake shoe to a drum which rotates with the wheel. Accordingly, the EPB ECU 40 can generate a parking brake force to the wheel through using the PKB actuator 41, to thereby keep the own vehicle SV at a stop state.

The steering ECU 50 is a controller of a well-known electric power steering system and is connected to a motor driver 51. The motor driver 51 is connected to a steering motor (M) 52. The steering motor 52 is embedded in an unillustrated "steering mechanism including a steering wheel SW, a steering shaft connected to the steering handle SW, a steering gear mechanism, and the like". The steering motor 52 generates torque through using electric power supplied from the motor driver 51. This torque makes it possible to apply steering assist torque or to steer a left steered wheel and a right steered wheel. Thus, the steering motor 52 can change a steering angle of the own vehicle SV.

The meter ECU 60 is connected to an unillustrated digital-display-type meter and is also connected to hazard lamps 61 and stop lamps 62. The meter ECU 60 can flash the hazard lamps 61 intermittently in response to an instruction from the DSECU 10, and turn on the stop lamps 62 in response to an instruction from the DSECU 10.

The alert ECU 70 is connected to a buzzer 71 and a display unit 72. The alert ECU 70 makes the buzzer 71 work to be able to warn the driver, lights (turns on) a mark (e.g., a warning lamp) for warning the driver on the display unit 72, displays an alert screen described later on the display unit 72, and/or displays an operating state of the lane keeping control on the display unit 72, in response to instructions from the DSECU 10. The display unit 72 displays various screens in response to the instructions from the DSECU 10. More specifically, the display unit 72 includes a head-up-display. In some embodiments, the display unit 72 includes another type display including a multi-function display.

<Operation Outline>

An outline of the operation of the present support device will next be described.

The DSECU 10 of the present support device determines that a "no-holding driving state condition" is satisfied when a "state in which a first condition that the steering torque is greater than a torque threshold which has been set to a first torque threshold Tr1$th$ is not satisfied" has continued for a first time threshold T1$th$ or more, while the lane keeping control is being performed. When the DSECU 10 determines that the "no-holding driving state condition" is satisfied, the DSECU 10 determines that a "no-holding driving state" has occurred in which the driver has not held the steering handle SW continuously. In this case (i.e., when the DSECU 10 determines that the "no-holding driving state" has occurred), the DSECU 10 performs a first alert (first alert control) for warning/urging the driver to hold the steering handle SW. Hereinafter, a "state in which the steering torque Tra is greater than the torque threshold Trth" is referred to as a "holding state" indicative of a state in which the driver holds the steering handle SW. Furthermore, a "state in which the steering torque Tra is equal to or smaller than the torque threshold Trth" is referred to as a "no-holding state" indicative of a state in which the driver does not hold the steering handle SW.

When the no-holding state has continued for a second time threshold T2$th$ from a time point (a first alert start time point) at which the DSECU 10 starts the first alert, in other words, when the state in which the first condition is not satisfied has continued for the second time threshold T2$th$ from the first alert start time point, the DSECU 10 determines whether or not the following incompetent state determination condition is satisfied. It is preferable that the second time threshold T2$th$ have been set to a value smaller than the first time threshold T1$th$.

The incompetent state determination condition is satisfied when a "state in which a second condition that the steering torque Tra is greater than the torque threshold which has been set to a second torque threshold Tr2$th$ is not satisfied" has continued for a third time threshold T3$th$ or more.

The second torque threshold Tr2$th$ has been set to a value greater than the first torque threshold Tr1$th$. Therefore, the second condition is satisfied when the driver holds the steering handle SW more firmly/tightly/strongly/certainly than when the first condition is satisfied. In other words, holding strength with which the driver holds the steering handle SW when the second condition is satisfied is greater than the holding strength when the first condition is satisfied.

It is preferable that the time threshold T3$th$ have been set to a value greater than the first time threshold T1$th$.

When the incompetent state determination condition is satisfied, the DSECU 10 determines that the driver has fallen into an incompetent state in which the driver loses his/her ability to drive the own vehicle SV, and performs a decelerating stop control (hereinafter, may be referred to as a "deceleration control") for decelerating the own vehicle SV until the own vehicle SV stops. When the own vehicle SV stops through the decelerating stop control, the DSECU 10 performs a stop state keeping control for keeping the own vehicle SV in the stop state.

The present support device continues performing the lane keeping control until the own vehicle SV stops through the decelerating stop control. Therefore, the present support device continues performing the lane keeping control for a time period (hereinafter, referred to as an incompetent state determination time period) for which the present support device is performing a determination process to determine whether or not the driver has fallen into the incompetent state. The incompetent state determination time period is a period for which the present support device monitors (or is continuously checking) whether or not the above described incompetent state determination condition becomes satisfied. Even if the driver has fallen into the incompetent state, the lane keeping control which is performed in the incompetent state determination time period may generates the steering torque Tra. That is, the steering torque Tra may become greater due to a reacting force against the force for changing the steering angle. Accordingly, even if the driver has actually fallen into the incompetent state, the DSECU 10 incorrectly determines that an operation state (hereinafter, referred to as a "steering state") of the steering handle SW is the holding state so as to incorrectly determine that the driver has not fallen into the incompetent state, when the steering torque Tra becomes greater than the torque threshold Trth. If this happens, the DSECU 10 does not perform the decelerating stop control even if the driver has actually fallen into the incompetent state.

From view of the above, the DSECU 10 of the present support device determines that the driver has fallen into the incompetent state, when the "state in which the second condition that the steering torque Tra is greater than the torque threshold which has been set to the second torque threshold Tr2$th$ is not satisfied" has continued for the third time threshold T3$th$. The second torque threshold Tr2$th$ is greater than the first torque threshold Tr1$th$, as described above. For this reason, the present support device can reduce a possibility that the present support device makes the above described incorrect determination due to the steering torque Tra which is generated by the lane keeping control. Accordingly, the present support device can perform the decelerating stop control appropriately.

The operation of the present support device will next be described in more detail with reference to FIG. 2.

Figure 2:
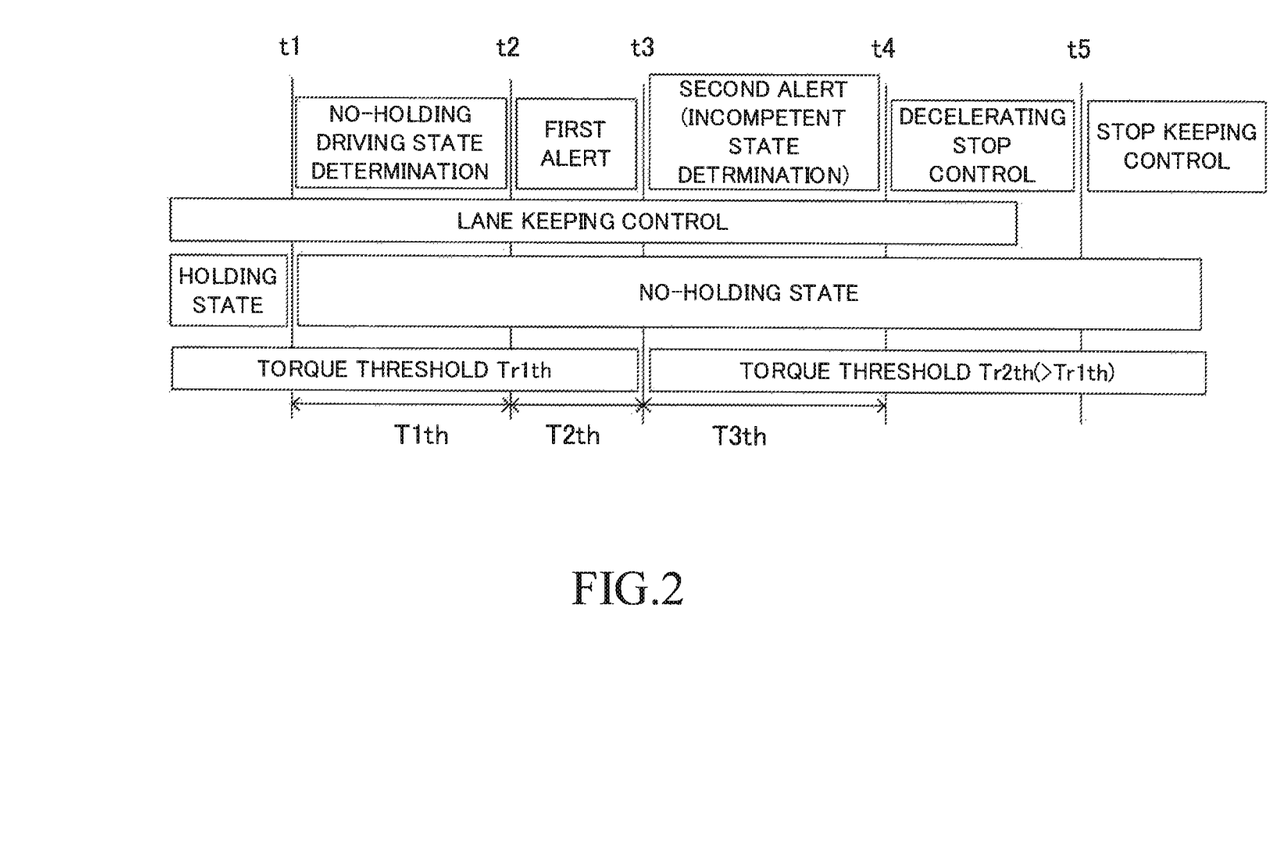
FIG. 2 is a timing chart illustrating an operation of the present support device.

The following assumptions are made in an example shown in FIG. 2.

The steering torque Tra changes from a value greater than the first torque threshold Tr1$th$ to a value equal to or smaller than the first torque threshold Tr1$th$, and therefore, the steering state changes from the holding state to the no-holding state, at a time point t1.

The steering torque Tra is smaller than the first torque threshold Tr1$th$ in a time period between the time point t1 and a time point t3. The steering torque Tra is equal to or smaller than the second torque threshold Tr2$th$ after the time point t3. Therefore, the steering state continues being the no-holding state after the time point t1.

The lane keeping control continues being performed until a time point t5 at which the own vehicle SV stops.

According to the above described assumptions, the steering torque Tra has been equal to or smaller than the first torque threshold Tr1$th$ for a time period between the time point t1 and a time point t2 at which the first time threshold T1$th$ elapses from the time point t1. That is, the state where the first condition is not satisfied continues for the first time threshold Tr1$th$. Therefore, the DSECU 10 determines that the no-holding driving state has occurred to start the first alert (i.e., the first alert control), at the time point t2. The first alert (the first alert control) is a control for displaying "the alert screen which warns/urges the driver to hold the steering handle SW" on the display unit 72.

The DSECU 10 continues performing the first alert for a time period between the time point t2 and the time point t3 at which the second time threshold T2$th$ elapses from the time point t2. According to the above described assumptions, the no-holding state in which the steering torque Tra is equal to or smaller than the first torque threshold Tr1$th$ continues during the time period between the time point t2 and the time point t3. The DSECU 10 starts a second alert (or a second alert control) for displaying the alert screen on display unit 72 with outputting/generating a first alert sound from the buzzer 71, at the time point t3. The DSECU 10 starts a determination process for determining (monitoring) whether or not the incompetent state determination condition is satisfied (i.e., starts the incompetent state determination) at the time point t3.

According to the above described assumptions, the steering torque Tra has been equal to or smaller than the second torque threshold Tr2$th$ since the time point t3. Therefore, a state where the second condition is not satisfied continues for a time period between the time point t3 and a time point t4 at which the third time threshold T3$th$ elapses from the time point t3. Consequently, at the time point t4, the incompetent state determination condition becomes satisfied, and the DSECU 10 determines that the driver has fallen into the incompetent state. At the time point t4, the DSECU 10 starts the decelerating stop control for decelerating the own vehicle at a predetermined deceleration α.

The own vehicle stops at the time point t5 though the decelerating stop control started at the time point t4. At the time point t5, the DSECU 10 stops/cancels the lane keeping control, and the starts the stop state keeping control.

(Lane Keeping Control)

The lane keeping control will next be described.

The lane keeping control is a control (a steering control) for providing the steering torque Tra to the steering mechanism to change the steering angel so as to keep the location of the own vehicle SV in the vicinity of a target traveling line in the lane (a traveling lane) in which the own vehicle SV is traveling. The lane keeping control is a well-known approach, and is described in Japanese Patent Application Laid-open No. 2008-195402, Japanese Patent Application Laid-open No. 2009-190464, Japanese Patent Application Laid-open No. 2010-6279, Japanese Patent No. 4349210, etc. Hereinafter, the lane keeping control will be simply described.

Figure 3:
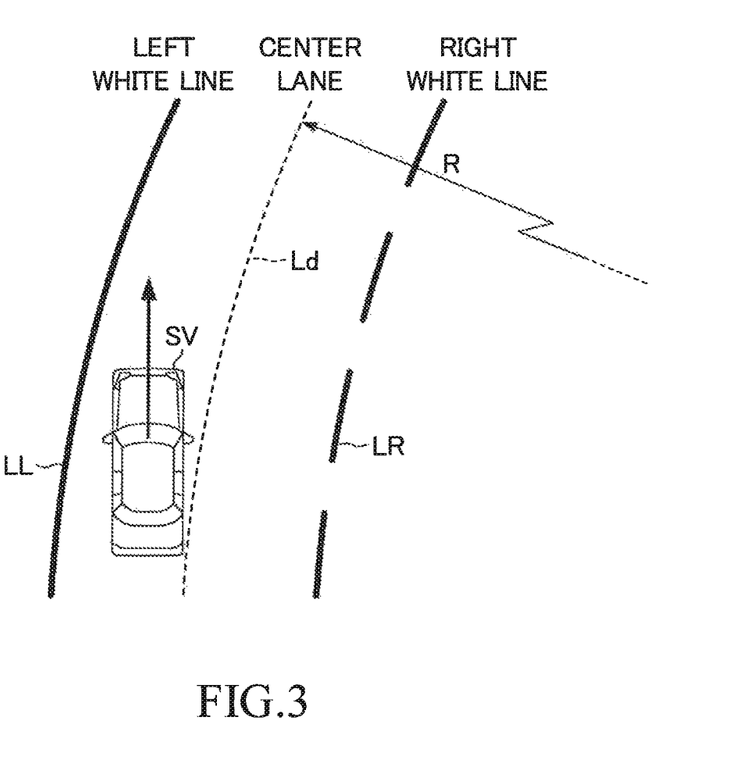
FIG. 3 is a plane diagram illustrating a left white line, a right white line, a target traveling line, and a curve radius.

When the driver has requested the lane keeping control through performing the operation on the operation switch 15, the DSECU 10 performs the lane keeping control. More specifically, as shown in FIG. 3, the DSECU 10 recognizes the left white line LL and the right white line LR of the lane in which the own vehicle SV is traveling based on information transmitted from the camera sensor 14, when the driver has requested the lane keeping control. Thereafter, the DSECU 10 determines the center line between the recognized left white line LL and right white line LR as the target traveling line (path) Ld. Furthermore. the DSECU 10 calculates a curve radius R of the target line Ld, and a location and a direction of the own vehicle SV in the traveling lane defined by the left white line LL and the right white line LR.

Figure 4:
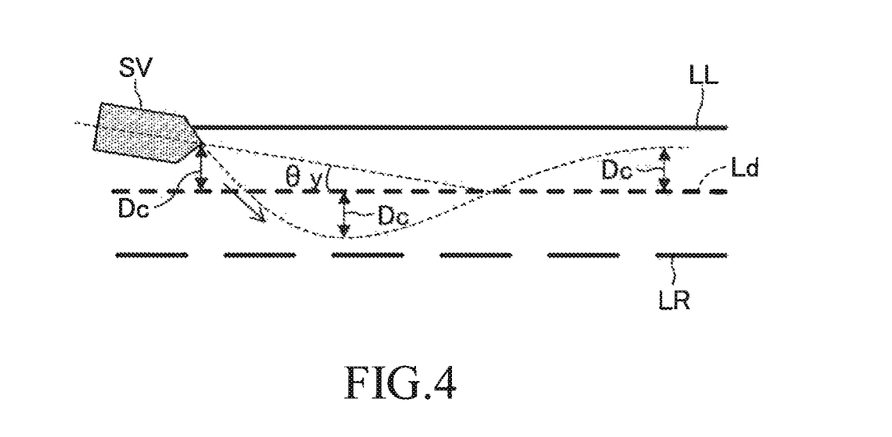
FIG. 4 is an explanatory diagram illustrating a lane keeping control.

As shown in FIG. 4, the DSECU 10 calculates a distance Dc (hereinafter, referred to as a "center distance Dc") between the center position on a front end of the own vehicle SV and the target traveling line Ld in a road width direction, and a tilt angle θy (hereinafter, referred to as a "yaw angle θy") formed between a direction of the target traveling line Ld and a traveling direction of the own vehicle SV.

The DSECU 10 calculates a target yaw rate YRc* in accordance with the following equation (1), based on the center distance Dc, the yaw angle θy, and a road curvature Cv (=1/R), every time a predetermined calculation cycle elapses. For the equation (1), a "K1", a "K2", and a "K3" expresses control gains. The target yaw rate YRc* is a yaw rate which is set so that the own vehicle SV can travel along the target traveling line Ld.

$$YRc^* = K1 \times Dc + K2 \times \theta y + K3 \times Cv \tag{1}$$

The DSECU 10 calculates a target steering torque Tr* for acquiring the target yaw rate YRc* based on the target yaw rate YRc* and the actual yaw rate YRa, every time a predetermined calculation cycle elapses. More specifically, the DSECU 10 has stored a look-up table which defines a relationship between a "deviation between the target yaw rate YRc* and the actual yaw rate YRa" and the target steering torque Tr*. The DSECU 10 applies the deviation between the target yaw rate YRc* and the actual yaw rate YRa to this table to obtain the target steering torque Tr*. The DSECU 10 controls the steering motor 52 in such a manner that the actual steering torque Tra coincides with the target steering torque Tr*. The above is the outline of the lane keeping control.

In some embodiments, the DSECU 10 calculates a target steering angle θ* in accordance with following equation (1A), based on the center distance Dc, the yaw angle θy, and the road curvature Cv. Thereafter, the DSECU 10 controls the steering motor 42 using the steering ECU 50 in such a manner that the actual steering angle θ detected by a steering angle sensor (not shown) coincides with the target steering angle θ*, so as to perform the lane keeping control. For the equation (1A), a "Klta1", a "Klta2", and a "Klta3" are predetermined control gains.

$$\theta^* = Klta1 \times Dc + Klta2 \times \theta v + Klta3 \times Cv \tag{1A}$$

<Specific Operation>

Figure 5:
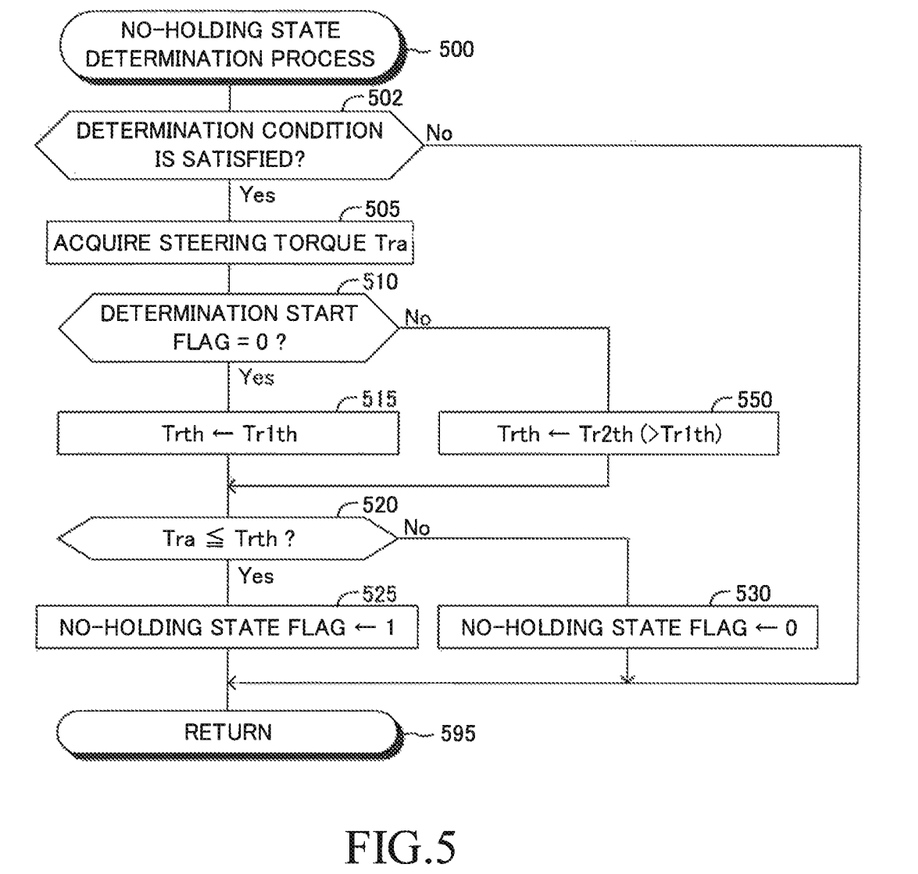
FIG. 5 is a flowchart illustrating a routine which a CPU of a driving support ECU shown in FIG. 1 executes to determine a state of a steering handle.

The CPU of the DSECU 10 executes a routine represented by a flowchart shown in FIG. 5, every time a predetermined time period elapses. The routine shown in FIG. 5 is a routine for determining whether the steering state is the holding state or the no-holding state.

When a predetermined timing has come, the CPU starts processes from Step 500 shown in FIG. 5, and proceeds to Step 502 to determine whether or not a determination condition is satisfied. This determination condition is satisfied when all of the following conditions are satisfied.

The lane keeping control is being performed.
The decelerating stop control is not being performed
The stop state keeping control is not being performed.

When the determination condition is not satisfied, in other words, when at least one of the above described conditions is not satisfied (i.e., while the DSECU 10 is not performing the lane keeping control, or while the DSECU 10 is performing either the decelerating stop control or the stop state keeping control), the CPU makes a "No" determination at Step 502, and proceeds to Step 595 to tentatively terminate the present routine.

On the other hand, when the determination condition is satisfied, the CPU makes a "Yes" determination at Step 502, and proceeds to Step 505 to acquire the steering torque Tra from the steering torque sensor 11. Subsequently, the CPU proceeds to Step 510 to determine whether or not a determination start flag has been set to "0". The determination start flag which has been set to "1" represents that an incompetent state determination for determining whether or not the incompetent state determination condition is satisfied has been started (refer to the time period between the time point t3 and the time point t4). In other words, when the value of the determination start flag is "1", the present time point is within the incompetent state determination time period. On the other hand, the determination start flag which has been set to "0" represents the incompetent state determination has not been started yet, in other words, that the present time point is outside the incompetent state determination time period. The determination start flag is set to "1" when the state in which the first condition is not satisfied continues during the time period between the time point t1 and the time point t3 shown in FIG. 2, in other words, when a state in which the steering state is the no-holding state continues during the time period between the time point t1 and the time point t3. The determination start flag is set to "0" through an initialization routine. The initialization routine is executed when the driver performs an operation for changing a position of an ignition key switch (now shown) of the own vehicle SV from an off-position to an on-position.

When the determination start flag has been set to "0", the CPU makes a "Yes" determination at Step 510, and proceeds to Step 515 to set the torque threshold Trth to the first torque threshold Tr1$th$. Subsequently, the CPU proceeds to Step 520 to determine whether or not the steering torque Tra acquired at Step 505 is equal to or smaller than the torque threshold Trth.

When the steering torque is equal to or smaller than the torque threshold Trth, the CPU makes a "Yes" determination at Step 520, and proceeds to Step 525 to set a no-holding state flag to "1". Subsequently, the CPU proceeds to Step 595 to tentatively terminate the present routine. The no-holding state flag which has been set to "1" represents that the steering state is the no-holding state. The no-holding state flag which has been set to "0" represents that the steering state is the holding state. The no-holding state flag is set to "0" through the initialization routine.

On the other hand, when the steering torque Tra is greater than the torque threshold Trth, the CPU 11 makes a "No" determination at Step 520, and proceeds to Step 530 to set the no-holding state flag to "0". Subsequently, the CPU proceeds to Step 595 to tentatively terminate the present routine.

In contrast, when the determination start flag has been set to "1", the CPU makes a "No" determination at Step 510, and proceeds to Step 550 to set the torque threshold Trth to the second torque threshold Tr2$th$. Subsequently, the CPU proceeds to the processes after Step 520. The second torque threshold Tr2$th$ is greater than the first torque threshold Tr1$th$.

As understood from the above, when the determination start flag has been set to "1", in other words, when the present time point is within the incompetent state determination time period, the torque threshold Trth is set to the second torque threshold Tr2$th$ greater than the first torque threshold Tr1$th$. Accordingly, within the incompetent state determination time period, the no-holding state flag is set to "1" when the steering torque Tra is equal to or smaller than the second torque threshold Tr2$th$, in other words, when the second condition is not satisfied.

Figure 6:
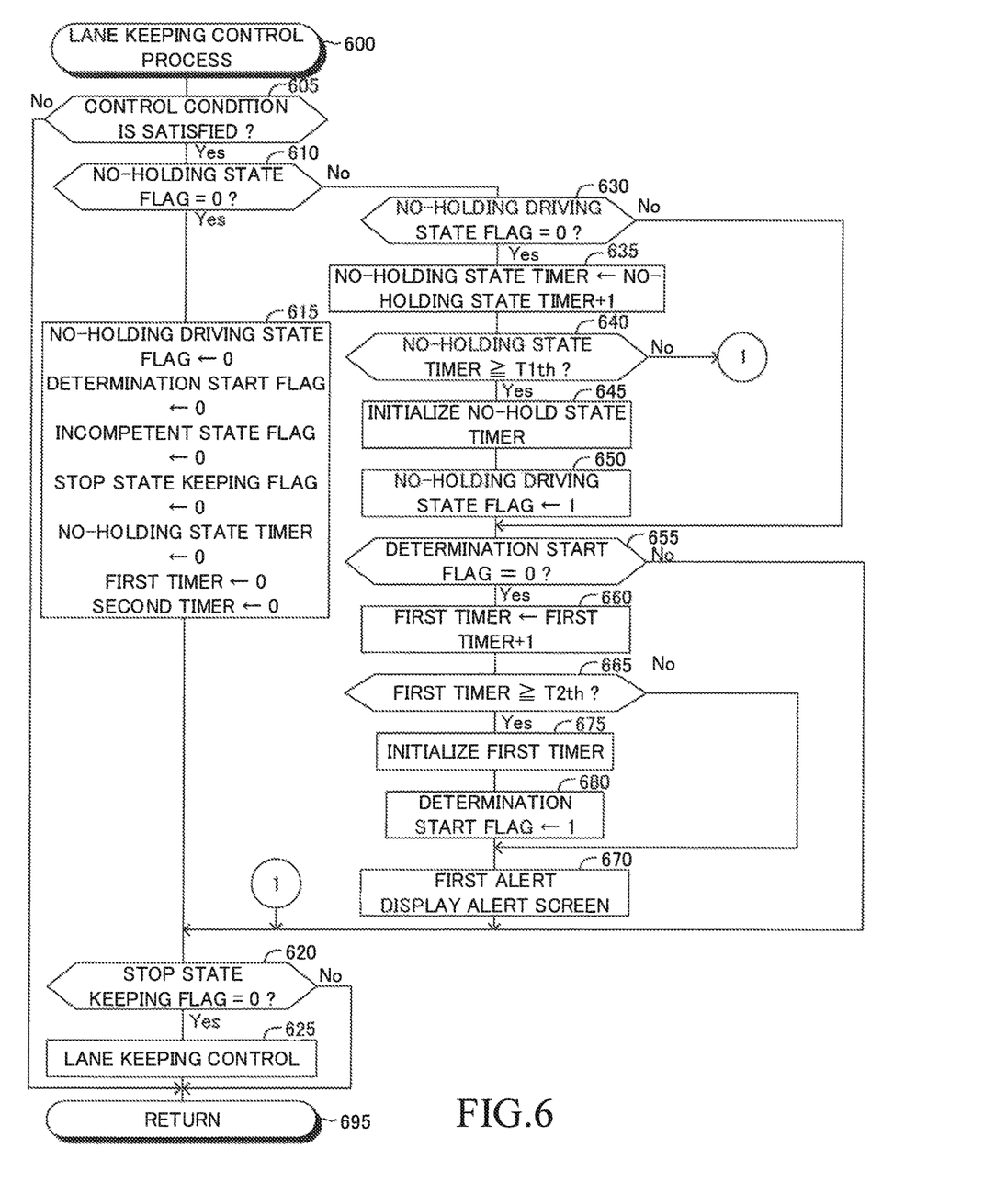
FIG. 6 is a flowchart illustrating a routine which the CPU of the driving support ECU shown in FIG. 1 executes to perform a first alert.

The CPU of the DSECU 10 executes a routine represented by a flowchart shown in FIG. 6, every time a predetermined time period elapses. The routine shown in FIG. 6 is a routine for performing the lane keeping control.

When a predetermined timing has come, the CPU starts processes from Step 600 shown in FIG. 6, and proceeds to Step 605 to determine whether or not a control conditions is satisfied. The control condition is satisfied when the both of the following conditions are satisfied.

The driver has requested the lane keeping control using the operation switch 15.
"The left white line LL and the right white line LR" of the lane in which the own vehicle SV is traveling have been recognized When at least one of the above described conditions is not satisfied, the CPU makes a "No" determination at Step 605, and proceeds to Step 695 to tentatively terminate the present routine. As a result, the lane keeping control is not performed.

On the other hand, all of the above described conditions are satisfied, the CPU makes a "Yes" determination at Step 605, and proceeds to Step 610 to determine whether or not the no-holding state flag has been set to "0".

When the no-holding state flag has been set to "0", in other words, when it is determined that the steering state is the holding state at the present time point, the CPU makes a "Yes" determination at Step 610, and proceeds to Step 615. At Step 615, the CPU sets all of the no-holding driving state flag, the determination start flag, an incompetent state flag, and a stop state keeping flag to "0". Furthermore, at Step 615, the CPU sets a no-holding state timer, a first timer, and a second timer, which are described later, to "0". In this manner, once it is determined that the steering state is the holding state, these flags and timers are set to "0" so as to be initialized through the process of Step 615. Note that these flags and timers are also set to "0" through the above described initialization routine.

The no-holding driving state flag is set to "1" when it is determined the no-holding driving state has occurred. As described above, the determination start flag is set to "1" when the incompetent state determination is started. The incompetent state flag is set to "1" when it is determined that the driver has fallen into the incompetent state. The stop state keeping flag is set to "1" when the stop state keeping control is started at a timing at which the own vehicle SV stops through the decelerating stop control.

Subsequently, the CPU proceeds to Step 620 to determine whether or not the stop state keeping flag has been set to "0". When the stop state keeping flag has been set to "0", in other words, when the stop state keeping control has not been performed yet, the CPU makes a "Yes" determination at Step 620, proceeds to Step 625 to perform the lane keeping control, and proceeds to Step 695 to tentatively terminate the present routine. On the other hand, when the stop state keeping flag has been set to "1", in other words, when the stop state keeping control has been performed, the CPU makes a "No" determination at Step 620, and directly proceeds to Step 695 to tentatively terminate the present routine. The stop state keeping control is started when the own vehicle SV stops through the decelerating stop control. Therefore, when the stop state keeping control is performed, the own vehicle SV stops. In this case, it is not necessary for the lane keeping control to be performed. Thus, while the stop state keeping control is being performed, the lane keeping is not performed.

On the other hand, when the no-holding state flag has been set to "1", in other words, when it has been determined that the steering state is the no-holding state, the CPU makes a "No" determination at Step 610, and proceeds to Step 630.

At Step 630, the CPU determines whether or not the no-holding driving state flag has been set to "0". When the no-holding driving state flag has been set to "0", the CPU makes a "Yes" determination at Step 630, proceeds to Step 635 to increment the no-holding state timer by "1", and proceeds to Step 640.

At step 640, the CPU determines whether or not the no-holding state timer is equal to or greater than the first time threshold T1*th*, in other words, whether or not the state in which the first condition is not satisfied has continued for the first time threshold T1*th*. When the first timer is smaller than the first time threshold T1*th*, in other words, when the state in which the first condition is not satisfied has not continued yet for the first time threshold T1*th*, the CPU makes a "No" determination at Step 640, and proceeds to processes after Step 620. In this case, the lane keeping control is performed because the stop state keeping flag has been set to "0" at Step 625.

On the other hand, while a state where the no-holding state flag is "1" continues, the process of Step 635 is executed repeatedly. Consequently, the no-holding state timer reaches the first time threshold T1*th*. In this case, when the CPU proceeds to Step 640, the CPU makes a "Yes" determination at Step 640, because the no-hold timer is equal to or greater than the first time threshold T1*th*, in other words, the state in which the first condition is not satisfied has continued for the first time threshold T1*th*. Subsequently, the CPU executes "processes of Step 645 and Step 650" described below in order, and thereafter, proceeds to processes after Step 655.

Step 645: The CPU sets the no-holding state timer to "0" to initialize the no-holding state timer.

Step 650: The CPU sets the no-holding driving state flag to "1".

Note that, when the CPU proceeds to Step 630 after the CPU sets the no-holding driving state flag to "1" at Step 650, the CPU makes a "No" determination at Step 630, and directly proceeds to Step 655 from Step 630.

At Step 655, the CPU determines whether or not the determination start flag has been set to "0", in other words, whether or not the incompetent state determination has already been started. When the determination start flag has been set to "0", in other words, when the incompetent state determination has not been started yet, the CPU makes a "Yes" determination at Step 655, and proceeds to processes after Step 660 in order to perform the first alert (the first alert control) for the second time threshold T2*th*.

At Step 660, the CPU increments the first timer by "1", and proceeds to Step 665. At Step 665, the CPU determines whether or not the first timer is equal to or greater than the second time threshold T2*th*. When the first timer is smaller than the second time threshold T2*th*, a time period for which the first alert continues has not reached the second time threshold T2*th*. In this case, the CPU makes a "No" determination at Step 665, proceeds to Step 670 to perform the first alert, and thereafter, proceeds to processes after Step 620. In the first alert, the CPU transmits, to the alert ECU 70, a display request/instruction for making the alert ECU 70 display the alert screen on the display unit 72. When the alert ECU 70 receives the display request, the alert ECU 70 displays the "alert screen for warning/urging the driver to hold the steering handle SW" on the display unit 72. It should be noted that the CPU continues performing the lane keeping control, because the stop state keeping flag has been set to "0".

While the no-holding state continues in spite of the first alert, the process of Step 660 is executed repeatedly. Consequently, the first timer reaches the second time threshold T2*th*. In this case, when the CPU proceeds to Step 665, the CPU makes a "Yes" determination at Step 665 because the first time is equal to or greater than the second time threshold T2*th*. Subsequently, the CPU executes a process of Step 675 and a process of Step 680 in order, and proceeds to processes after Step 670.

Step 675: The CPU sets the first timer to "0" to initialize the first timer.

Step 680: The CPU sets the determination start flag to "1".

When the no-holding state continues after the first alert has been performed for the second time threshold T2*th*, the driver may have fallen into the incompetent state. Thus, the CPU sets the determination flag to "1" to start determining (the determination of the incompetent state) whether or not the above described incompetent state determination condition is satisfied. The lane keeping control has been performed continuously because the stop state keeping flag has still been set to "0".

After the time point at which the determination start flag is set to "1" at Step 680, both the no-holding driving state flag and the determination start flag have been set to "1". Therefore, the CPU makes a "No" determination at Step 630, and directly proceeds to Step 655. The CPU makes a "No" determination at Step 655, and directly proceeds to Step 620 without executing the processes of Step 660 through Step 670. In this case as well, while the stop state keeping flag is "0", the lane keeping control continues being performed.

Figure 7:
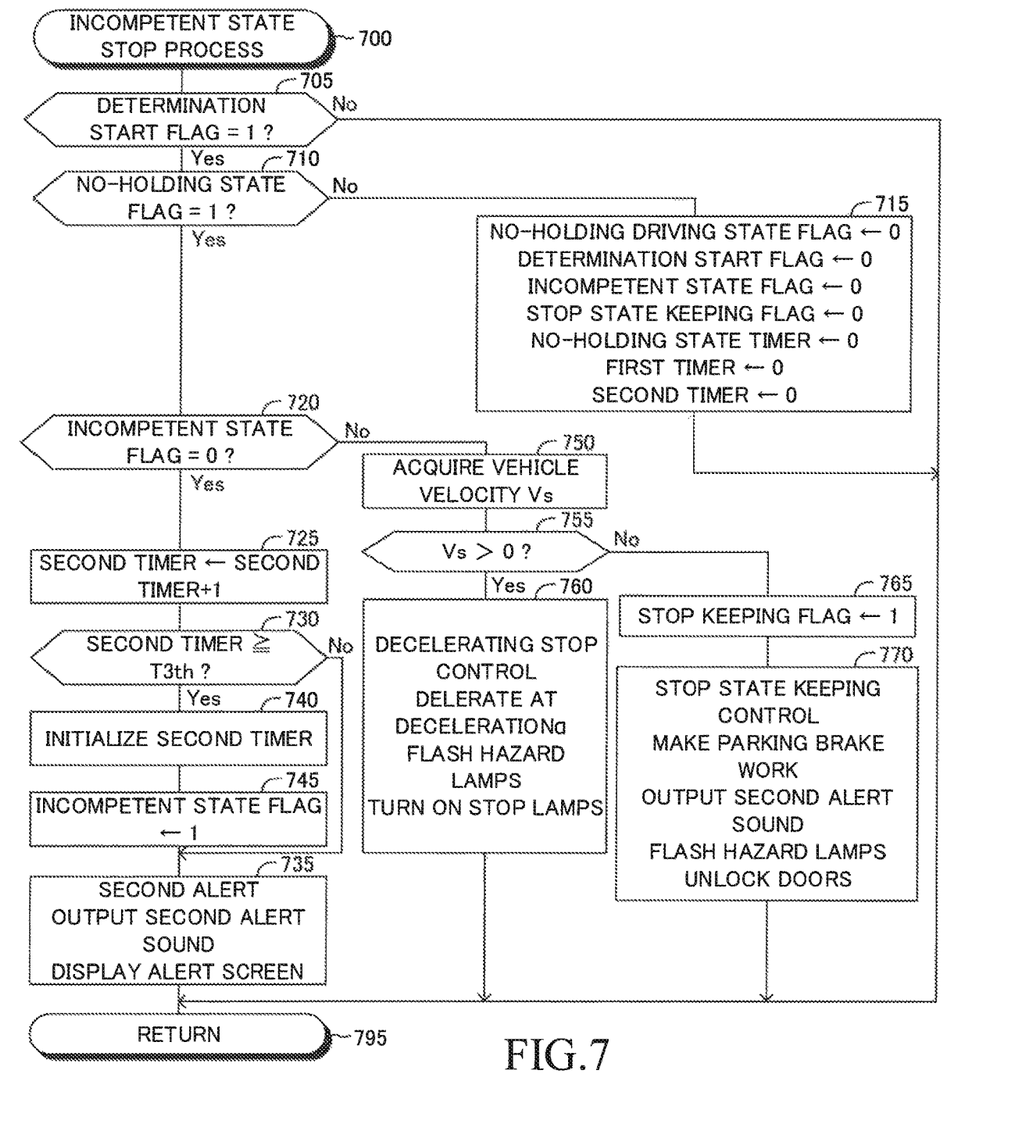
FIG. 7 is a flowchart illustrating a routine which the CPU of driving support ECU shown in FIG. 1 executes to perform a decelerating stop control.

The CPU of the DSECU 10 executes a routine represented by a flowchart shown in FIG. 7, every time a predetermined time period elapses. The routine shown in FIG. 7 is a routine for determining whether or not the driver has fallen into the incompetent state, and for performing the decelerating stop control and the stop state keeping control when it is determined that the driver has fallen into the incompetent state.

When a predetermined timing has come, the CPU starts processes from Step 700 shown in FIG. 7, and proceeds to Step 705 to determine whether or not the determination start flag has been set to "1". When the determination start flag has been set to "0", the CPU makes a "No" determination at Step 705, and directly proceeds to Step 795 to tentatively terminate the present routine. As a result, when the determination start flag has been set to "0", any of the determination of the incompetent state, the decelerating stop control, and the stop state keeping control are not performed.

On the other hand, when the determination start flag has been set to "1", the CPU makes a "Yes" determination at Step 705, and proceeds to Step 710 to determine whether or not the no-holding state flag has been set to "1".

Meanwhile, when the determination start flag has been set to "1", the torque threshold Trth has been set to the second torque threshold Tr2th greater than the first torque threshold Tr1th at Step 520 of the routine shown in FIG. 5. Hence, only when the driver holds the steering handle SW more firmly (strongly), the steering torque Tra becomes equal to or greater than the torque threshold Trth (=Tr2th). In other words, the steering torque Tra generated only by the lane keeping control is smaller than this torque threshold Trth (=Tr2th). Therefore, as long as the driver does not hold the steering handle SW more firmly (strongly), the steering torque Tra does not become equal to or greater than the torque threshold Trth, and thus, the no-holding state flag has been set to "1" at Step 525.

Accordingly, when the no-holding state flag has been set to "0", it can be determined that the driver has not fallen into the incompetent state and that driver has held the steering handle SW firmly. Therefore, in the case where the no-holding state flag has been set to "0", the CPU makes a "No" determination at Step 710, and proceeds to Step 715 to set all of the no-holding driving state flag, the determination start flag, the incompetent state flag, and the stop state keeping flag to "0". Thereafter, the CPU proceeds to Step 795 to tentatively terminate the present routine.

On the other hand, when the no-holding state flag has been set to "1", the CPU makes a "Yes" determination at Step 710, and proceeds to Step 720 to determine whether or not the incompetent state flag has been set to "0", in other words, whether or not it has been determined that the driver has fallen into the incompetent state.

When the incompetent state flag has been set to "0", in other words, when it has not been determined that the driver has fallen into the incompetent state, the CPU makes a "Yes" determination at Step 720, and proceeds to Step 725 to increment the second timer by "1". Subsequently, the CPU proceeds to Step 730 to determine whether or not the second timer is equal to greater than the third time threshold T3th.

When the second timer is smaller than the third time period T3th, the CPU makes a "No" determination at Step 730, proceeds to Step 735 to perform the second alert, and thereafter, proceeds to Step 795 to tentatively terminate the present routine. In the same way as the first alert, the CPU transmits the display request/instruction for displaying the alert screen to the alert ECU 70 in order to perform the second alert. When the alert ECU 70 receives the display request, the alert ECU 70 displays the same alert screen as that displayed through the first alert on the display unit 72. Furthermore, the CPU outputs/generates "the first alert sound" from the buzzer 71. The first alert sound is a buzzer sound which is intermittently generated at a predetermined first interval. More specifically, the CPU transmits an output request/instruction for making the alert ECU 70 output/generate the first alert sound to the alert ECU 70. When the alert ECU 70 receives the output request/instruction, the alert ECU 70 makes the buzzer 71 work so as to output the first alert sound.

While the no-holding state continues in spite of the second alert, the process of Step 725 is executed repeatedly. Consequently, the second timer reaches the third time threshold T3th. In this case, the incompetent state determination condition is satisfied, because a state where the second condition is not satisfied has continued for the third time threshold T3th. In this case, when the CPU proceeds to Step 730, the CPU makes a "Yes" determination at Step 730, executes processes of Step 740 and Step 745 described below in order, and thereafter, proceeds to Step 735.

Step 740: The CPU sets the second timer to "0" to initialize the second timer.

Step 745: The CPU sets the incompetent state flag to "1". That is, the CPU determines that the driver has fallen into the incompetent state and stores that determination result into the incompetent state flag.

When the CPU proceeds to Step 720 after the incompetent state flag has been set to "1" at Step 745, the CPU makes a "No" determination at Step 720, and proceeds to Step 750. Although not shown in any FIGs, in some embodiments, when the incompetent state flag has been set to "1", the CPU 11 proceeds to Step 720 from Step 705 without executing a process of Step 710.

At Step 750, the CPU acquires the vehicle velocity Vs from the vehicle velocity sensor 13, and proceeds to Step 755 to determine whether or not the vehicle velocity Vs acquired at Step 750 is higher than "0 km/h".

When the vehicle velocity Vs is higher than "0 km/h", in other word, when the own vehicle SV has not stopped yet, the CPU makes a "Yes" determination at Step 755, proceeds to Step 760 to perform the decelerating stop control, and thereafter proceeds to Step 795 to tentatively terminate the present routine.

The decelerating stop control will next be described.

The decelerating stop control is the control for gradually decelerating the own vehicle SV at the deceleration α, in other words, the control for setting the target acceleration to "−α". The CPU controls the engine actuator 21 using the engine ECU 20 and the brake actuator 31 using the brake ECU 30 in such a manner that the deceleration of the own vehicle SV coincides with the deceleration α. More specifically, the CPU transmits a torque decreasing request to the engine ECU 20. When the engine ECU 20 receives the torque decreasing request, the engine ECU 20 drives the engine actuator 21 in such a manner the torque of the internal combustion engine 22 becomes the minimum torque (in actuality, the engine ECU 20 drives the throttle valve actuator so as to change the opening of the throttle valve to the minimum opening). Furthermore, the CPU transmits a brake request including the deceleration α to the brake ECU 30. When the brake ECU 30 receives the brake request, the brake ECU 30 controls the brake actuator 34 to decelerate the own vehicle SV through braking in such a manner the actual acceleration of the own vehicle SV coincides with the deceleration α included in the brake request. It should be noted that the CPU acquires the actual acceleration of the own vehicle SV based on a change amount of the vehicle velocity Vs for a predetermined unit time period.

Furthermore, the CPU outputs/generates the second alert sound from the buzzer 71. The second alert sound is a buzzer sound which is intermittently generated at a predetermined second interval shorter than the first interval of the first alert sound. A volume of the second alert is greater than a volume of the first alert sound.

Furthermore, the CPU makes the meter ECU 60 flash the hazard lamps 61 intermittently and turn on the stops lamps 62.

When the decelerating stop control is performed, the vehicle velocity Vs gradually decelerates to become "0 km/h". When the vehicle velocity Vs become "0 km/h"

owing to the decelerating stop control, the CPU makes a "No" determination at Step 755, executes processes of Step 765 and Step 770 described below in order, and thereafter, proceeds to Step 795 to tentatively terminate the present routine.

Step 765: The CPU sets the stop state keeping flag to "1". As a result, the CPU directly proceeds to Step 695 shown in FIG. 6 from Step 620 to stop the lane keeping control.

Step 770: The CPU performs the stop state keeping control for keeping the own vehicle at/in the stop state.

The stop state keeping control will next be described.

The CPU makes the EPB ECU 40 provide the parking brake force to the wheels. The parking brake force keeps the own vehicle SV at/in the stop state. Furthermore, the CPU outputs/generates the second alert sound from the buzzer 71. In addition, the CPU makes the meter ECU 60 flash the hazard lamps 61 intermittently and turn on or intermittently flash the stops lamps 62. In some embodiments, the CPU makes a door lock ECU unlock doors of the own vehicle SV.

Although not shown in any FIGs, the CPU terminates the stop state keeping control when a predetermined time period elapses from a time point at which the stop state keeping control is started. In this case, the CPU sets all of the no-holding driving state flag, the determination start flag, the incompetent state flag, and the stop state keeping flag to "0", and sets all of the no-holding state timer, the first timer, and the second timer to "0".

As understood from the above, when the "state in which the first condition that the steering torque Tra is greater than the first torque threshold Tr1$th$ is not satisfied" has continued for the first time threshold T1$th$ while the lane keeping control is being performed, the CPU determines that the steering state is the no-holding driving state. In this case, the CPU starts the first alert and continues performing the lane keeping control. When the "state in which the second condition that the steering torque Tra is greater than the second torque threshold Tr2$th$ is not satisfied" has continued for the third time threshold T3$th$ from a "determination start point at which the second time threshold T2$th$ elapses form the time point at which the CPU determines the no-holding driving state", the CPU determines that the incompetent state determination condition is satisfied, in other words, that the driver has fallen into the incompetent state, so as to start the decelerating stop control.

Although the present support device continues the lane keeping control after the time point at which the present support device determines that the no-holding driving state has occurred, the present support device can reduce the "possibility that the present support device incorrectly/erroneously determines that the driver has not fallen into the incompetent state due to the increase in the steering torque Tra caused by the lane keeping control, in spite of the situation in which the driver has actually fallen into the incompetent state". Therefore, the present support device can perform the decelerating stop control (and the stop state keeping control after the decelerating stop control) when the driver has actually fallen into the incompetent state.

Modification Example

Figure 8:
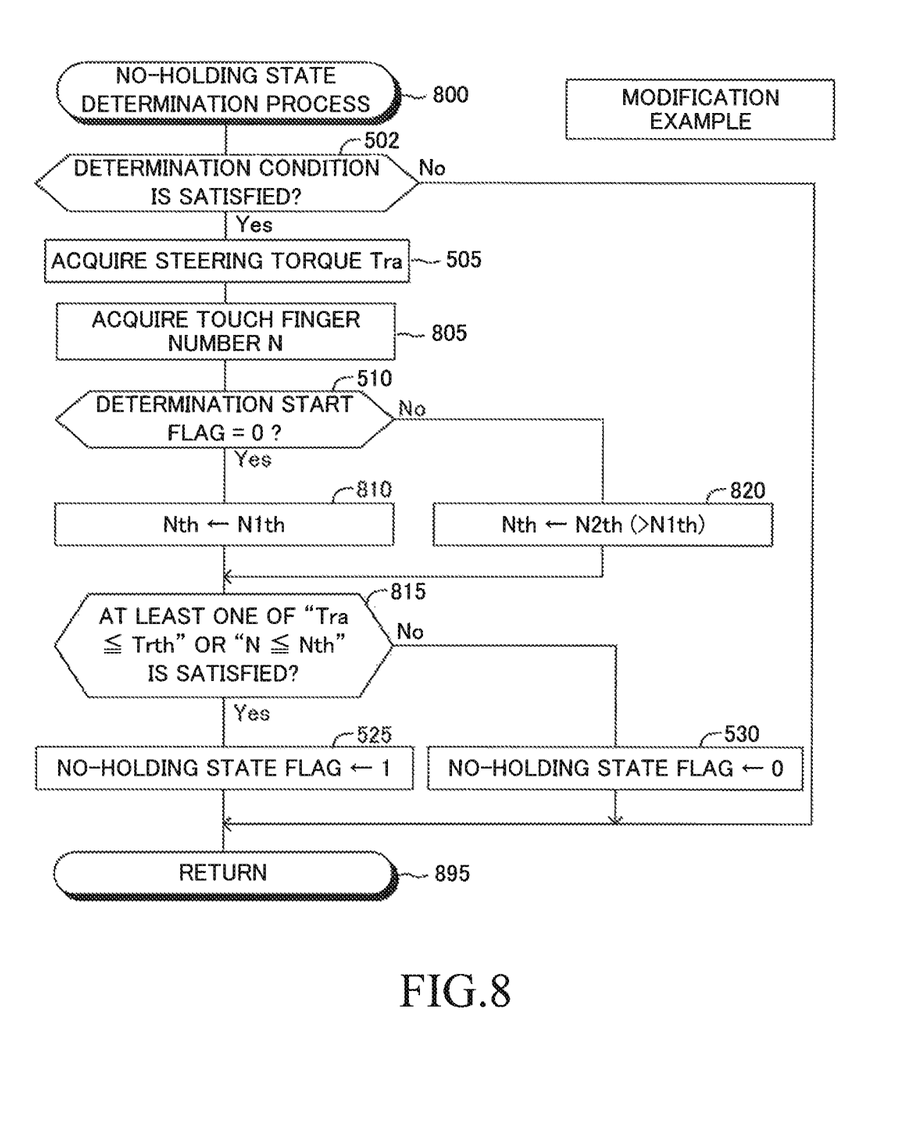
FIG. 8 is a flowchart illustrating a routine which the CPU of driving support ECU according to a modification example of the present support device executes to determine the state of the steering handle.

A modification example of the present support device is different from the above described support device only in that this modification example determines whether or not the no-holding driving state has occurred and whether or not the driver has fallen into the incompetent state, using not only the steering torque Tra but also the number (a touch finger number) N of the driver's fingers which are touching the steering wheel SW. This difference will be mainly described below.

A condition (a no-holding driving state determination condition) for determining whether or not the no-holding driving state has occurred and the incompetent state determination condition in the present modification are as follows.

The no-holding driving state determination condition: A state where a "first condition that the steering torque Tra is greater than the torque threshold Trth which has been set to the first torque threshold Tr1$th$ and the touch finger number N is greater than a first number threshold N1$th$" is not satisfied continues for the first time threshold T1$th$.

The incompetent state determination condition: A state where a "second condition that the steering torque Tra is greater than the torque threshold Trth which has been set to the first torque threshold Tr1$th$ and the touch finger number N is greater than a second number threshold N2$th$ greater than the first number threshold N1$th$" is not satisfied continues for the third time threshold T3$th$.

In this manner, the torque threshold Trth of the first condition is the same as the torque threshold Trth of the second condition. However, in some embodiments, the torque threshold Trth of the second condition is greater than the torque threshold Trth of the first condition.

As the touch finger number N is greater, it can be determined that the driver holds the steering handle SW more firmly. Therefore, the second condition of this modification example is a condition satisfied when the driver holds the steering handle SW more firmly than when the first condition is satisfied.

The CPU of the DSECU 10 according to this modification example executes a routine represented by a flowchart shown in FIG. 8 in place of the routine represented by a flowchart shown in FIG. 5, every time a predetermined time period elapses. In FIG. 8, the same Steps as the Steps shown in FIG. 5 are denoted with common step symbols for the Steps shown in FIG. 5, and description thereof is omitted.

When a predetermined timing has come, the CPU starts processes from Step 800 shown in FIG. 8. When the CPU makes a "Yes" determination at Step 502, the CPU proceeds to Step 505 to acquire the steering torque Tra. Thereafter, the CPU proceeds to Step 805 to acquire the touch finger number N from the touch sensor 12. When the determination start flag has been set to "0", the CPU makes a "Yes" determination at Step 510, and proceeds to Step 810.

At Step 810, the CPU sets the number threshold Nth to the first number threshold N1$th$, and proceeds to Step 815 to determine whether or not at least one of the following conditions A1 and A2 is satisfied.

Condition A1: The steering torque acquired at Step 505 is equal to or smaller than the torque threshold Trth.

Condition A2: The touch finger number N acquired at Step 805 is equal to or smaller than the number threshold Nth.

When at least one of the conditions A1 and A2 is satisfied, in other words, when the first condition of the present modification example is not satisfied, the CPU makes a "Yes" determination at Step 815, and proceeds to set the no-holding state flag to "1". Thereafter, the CPU proceeds to Step 895 to tentatively terminate the present routine.

On the other hand, neither the condition A1 nor the condition A2 is satisfied, in other words, when the steering torque Tra is greater than the torque threshold Trth and the touch finger number N is greater than the number threshold Nth (=N1$th$), the first condition of the present modification example is satisfied. In this case, the CPU makes a "No" determination, proceeds to Step 530 to set the no-holding state flag to "0", and proceeds to Step 895 to tentatively terminate the present routine.

When the determination start flag has been set to "1", the CPU makes a "No" determination at Step 510, and proceeds to Step 820 to set the number threshold Nth to the second number threshold N2$th$. Thereafter, the CPU proceeds to processes after Step 815. The second number threshold N2$th$ is a value greater than the first number threshold N1$th$. At Step 815 after the number threshold Nth is set to the second number threshold N2$th$, the CPU determines whether or not the second condition is unsatisfied.

As understood from the above, when the determination start flag has been set to "1" (i.e., when the present time point is within the incompetent state determination time period), the number threshold Nth is set to the second number threshold N2$th$ greater than the first number threshold N1$th$. Thus, when the "second condition which is satisfied when the driver holds the steering handle SW more firmly than when the first condition is satisfied" is not satisfied, the no-holding state flag is set to "1". In other words, when at least one of "the condition that the steering torque Tra is equal to or smaller than the torque threshold Trth" and "the condition that the touch finger number N is equal to or smaller than the second number threshold N2$th$" is satisfied, the no-holding state flag is set to "1"

When the driver has been in a normal state, in other words, when the driver has not fallen into the incompetent state, the driver is likely to hold the steering handle SW more firmly owing to the first alert and the second alert. Therefore, a "possibility that the touch finger number N changes from a value smaller than the first number threshold N1$th$ to a value greater than the second number threshold N2$th$ during the incompetent state determination time period" is high. In contrast, when the driver has fallen into the incompetent state, the above possibility is low. Accordingly, even if the steering torque Tra becomes greater than the torque threshold Trth due to the lane keeping control while the driver has actually fallen into the incompetent state, the second condition is unlikely to be satisfied. For the reasons above, the support device of the modification example can reduce a possibility that the support device incorrectly/erroneously determines that the driver is holding the steering handle SW to thereby incorrectly determine that the driver has not fallen into the incompetent state in spite of the situation in which the driver has actually fallen into the incompetent state.

The present invention is not limited to the above-described embodiment, and can adopt various modifications within range of the present invention. In some embodiments, the CPU starts the incompetent state determination (i.e., starts the determination process for determining whether or not the incompetent state determination condition is satisfied) from a time point at which it is determined the steering state is the no-holding driving state, in other words, a time point (the time point t2 shown in FIG. 2) at which the first alert is started. More specifically, the CPU starts the second alert and the incompetent state determination using the torque threshold Trth which has been set to the second torque threshold Tr2$th$, from the time point t2. The CPU sets the determination start flag to "1" immediately after a process of Step 650 shown in FIG. 6, and thereafter, directly proceeds to processes after Step 620 without executing processes of Step 655 through Step 680. As a result, the first alert is not performed. Note that, in some embodiments, the CPU starts the first alert from the time point t2. In this case, the second is not performed.

Although the above described support device performs the lane keeping control on the premise that both of "the left white line LL and the right white line LR" of the lane in which the own vehicle SV is traveling have been recognized, in some embodiments, even if the present support device does not recognize any of "the left white line LL and the right white line LR" or one of "the left white line LL and the right white line LR", the present support device performs the lane keeping control. In this case, the CPU determines/adopts, as the target traveling line Ld, a path along which a "preceding vehicle which is present ahead of the own vehicle SV" has been traveling. More specifically, the CPU determines a "path along which the center of a rear end of the preceding vehicle in a left-right direction has traveled", as the target traveling line Ld.

Furthermore, the lane keeping control is performed only when an adaptive cruise control (ACC) is being performed. The adaptive cruise control is a control for making the own vehicle SV follow a preceding vehicle (ACC following target vehicle) which is traveling ahead of the own vehicle SV in a front area of the own vehicle SV with keeping a distance between the own vehicle and the preceding vehicle at a predetermined distance, based on the object information. The ACC is a well-known approach, and is described in Japanese Patent Application Laid-open No. 2014-148293, Japanese Patent Application Laid-open No. 2006-315491, Japanese Patent No. 4172434, Japanese Patent No. 4929777, etc. It should be noted that the ACC is stopped/canceled when and after the decelerating stop control is started.

In some embodiments, the present support device has a sensor (a millimeter wave radar, an infrared radar, a sonar radar, or the like) for emitting/transmitting a wireless medium and receive the wireless medium, so as to detect the object.

The first alert and the second alert are not limited to the above embodiment. The first alert and the second alert can adapt any appropriate alerts, as long as second alert warns the driver more strongly than the first alert, in other words, a warning level of the second alert is higher than that of the first alert. For example, the present support device outputs the alert sound from the buzzer 71 without displaying the alert screen in the first alert and the second alert. In this case, in some embodiments, the interval (cycle) of the second alert sound of the second alert is shorter than the interval (cycle) of the first alert sound of the first alert. Furthermore, in some embodiments, the volume of the second alert sound is greater than the volume the first alert sound volume.

What is claimed is:

1. A driving support device comprising:
a steering control unit for performing a steering control for changing a steering angle of an own vehicle in such a manner that the own vehicle travels along a target path;
a deceleration unit for performing a deceleration control for decelerating the own vehicle while the steering control unit is performing the steering control; and
a steering torque detection unit for detecting a steering torque,
the steering control unit configured to start a first alert to a driver and to continue performing the steering control, when a state in which holding state information does not satisfy a predetermined first condition continues for a first time threshold or more while the steering control unit is performing the steering control, the holding state information including information indicative of the steering torque detected by the steering torque detection unit and representing a holding state of a steering handle of the own vehicle by the driver; and the deceleration unit configured to start the deceleration control when a state in which the holding state information does not satisfy a predetermined second condition continues for a second time threshold or more after a predetermined time point which is after a time point at which the steering control unit starts the first alert, the predetermined second condition being a condition satisfied when the holding state information indicates that the driver holds the steering handle more firmly than when the holding state information satisfies the first condition.

2. The driving support device according to claim 1, wherein, the steering control unit is configured to determine that the holding state information does not satisfy the first condition, when the steering torque is equal to or smaller than a predetermined first torque threshold, and the deceleration unit is configured to determine that the holding state information does not satisfy the second condition, when the steering torque is equal to or smaller than a predetermined second torque threshold which is greater than the first torque threshold.

3. The driving support device according to claim 1, further comprising a touch finger number detection unit for detecting a touch finger number indicative of the number of the driver's fingers which are touching the steering handle, wherein, the holding state information includes the touch finger number detected by the touch finger number detection unit, the steering control unit is configured to determine that the holding state information does not satisfy the first condition, when at least one of a condition that the steering torque is equal to or smaller than a predetermined torque threshold or a condition that the touch finger number is equal to or smaller than a predetermined first number threshold is satisfied, and the deceleration unit is configured to determine that the holding state information does not satisfy the second condition, when at least one of a condition that the steering torque is equal to or smaller than the torque threshold or a condition that the touch finger number is equal to or smaller than a predetermined second number threshold greater than the first number threshold is satisfied.

4. The driving support device according to claim 1, wherein the deceleration unit is configured to have set the second time threshold to a value greater than the first time threshold.

\* \* \* \* \*